(12) United States Patent
Suzuki (10) Patent No.: US 7,209,419 B2
(45) Date of Patent: Apr. 24, 2007

(54) RECORDING CONDITION COMPENSATION METHOD, PROGRAM, RECORDING MEDIUM, AND INFORMATION RECORDING APPARATUS

(75) Inventor: Haruyuki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 619 days.

(21) Appl. No.: 10/641,074

(22) Filed: Aug. 15, 2003

(65) Prior Publication Data

US 2004/0037192 A1   Feb. 26, 2004

(30) Foreign Application Priority Data

Aug. 23, 2002   (JP)   ............... 2002-243222

(51) Int. Cl.
*G11B 7/00*   (2006.01)
(52) U.S. Cl. .............................. 369/47.53; 369/53.26
(58) Field of Classification Search ............... None
See application file for complete search history.

(56) References Cited

U.S. PATENT DOCUMENTS

| | | | |
|---|---|---|---|
| 5,218,588 A | 6/1993 | Suzuki | |
| 5,222,057 A | 6/1993 | Suzuki et al. | |
| 5,274,622 A * | 12/1993 | Kono | 369/116 |
| 5,309,418 A | 5/1994 | Suzuki | |
| 5,371,726 A | 12/1994 | Suzuki | |
| 5,375,108 A | 12/1994 | Suzuki | |
| 5,442,607 A | 8/1995 | Suzuki | |
| 5,487,055 A | 1/1996 | Suzuki | |
| 5,521,892 A | 5/1996 | Suzuki | |
| 5,604,722 A | 2/1997 | Suzuki | |
| 5,631,886 A | 5/1997 | Suzuki | |
| 6,128,261 A | 10/2000 | Suzuki | |
| 6,333,903 B1 | 12/2001 | Suzuki | |
| 2001/0038587 A1 * | 11/2001 | Shumura et al. | 369/53.18 |
| 2002/0009030 A1 * | 1/2002 | Matsumoto et al. | 369/47.53 |
| 2002/0012296 A1 | 1/2002 | Suzuki | |
| 2002/0012297 A1 | 1/2002 | Suzuki | |
| 2002/0044507 A1 | 4/2002 | Hagiwara et al. | |
| 2003/0035354 A1 | 2/2003 | Suzuki | |

(Continued)

FOREIGN PATENT DOCUMENTS

JP    H4-263130    9/1992

(Continued)

*Primary Examiner*—Wayne Young
*Assistant Examiner*—Lixi Chow
(74) *Attorney, Agent, or Firm*—Dickstein Shapiro LLP (57) ABSTRACT

A recording condition compensation method for preventing a degradation of recording quality and stably achieving excellent recording quality is provided for an information recording apparatus. This method includes the steps of detecting temperature information in the vicinity of a light source at a predetermined timing, acquiring wavelength information of an optical beam emitted from the light source based on the detected temperature information and pre-acquired wavelength temperature characteristic information of the optical beam emitted from the light source, acquiring wavelength dependency information of a recording condition for an information recording medium, and compensating the recording condition for recording information on the information recording medium based on the wavelength information and the wavelength dependency information of the recording condition. In this way, even when the light source temperature at a time of recording is different from the light source temperature at an earlier time in which the recording condition has been set, the recording condition can still be accurately compensated without expending a partition in the test-writing area.

15 Claims, 5 Drawing Sheets

U.S. PATENT DOCUMENTS

| | | |
|---|---|---|
| 2003/0048713 A1 | 3/2003 | Suzuki |
| 2003/0156514 A1 | 8/2003 | Suzuki |
| 2003/0156519 A1* | 8/2003 | Yokoi ...................... 369/59.11 |

FOREIGN PATENT DOCUMENTS

| | | |
|---|---|---|
| JP | 05-144061 | 6/1993 |
| JP | H5-144061 | 6/1993 |
| JP | 06-076288 | 3/1994 |
| JP | H11-296885 | 10/1999 |
| JP | 3035034 | 2/2000 |
| JP | 3089844 | 7/2000 |
| JP | 2001-297437 | 10/2001 |

* cited by examiner

RECORDING CONDITION COMPENSATION METHOD, PROGRAM, RECORDING MEDIUM, AND INFORMATION RECORDING APPARATUS

BACKGROUND OF THE INVENTION

1. Field of the Invention

The present invention relates generally to a recording condition compensation method, a program, a recording medium, and an information recording apparatus, and particularly to a recording condition compensation method for compensating a recording condition when recording information on an information recording medium, a program used in an information recording apparatus, a recording medium on which the program is recorded, and an information recording apparatus that records information on the information recording medium.

2. Description of the Related Art

In recent years and continuing, with the advancement of the performance of personal computers, there have been and are increasingly more personal computers that are capable of handling audio-visual (AV) information such as music and images. Since AV information generates a very large information storage requirement, optical disks such as compact disks (CD) and digital versatile disks (DVD) are attracting attention as information recording media. Thus, with the growing popularity of these optical disks, their prices are starting to drop, and also it is becoming increasingly common to include an optical disk apparatus as one of the peripherals of a personal computer, the optical disk apparatus functioning as an information recording apparatus of the personal computer. In the optical disk apparatus, the recording and erasing of information is realized by irradiating a microscopic laser beam spot on the recording side of the optical disk on which a spiral track or concentric tracks are formed, and replaying of information is realized via the reflection of light from the recording side. Also, in the optical disk apparatus, an optical pick-up device is implemented in order to irradiate the laser beam onto the recording side of the information recording medium and to receive the light reflected from the recording side.

Normally, the optical pick-up device includes a light source that emits a laser beam with predetermined light emission power (output), an optical system that guides the laser beam emitted from the light source onto the recording side of the information recording medium and guides the laser beam reflected from the recording side to a predetermined light receiving position, and a light receiving unit arranged at the light receiving position.

In the optical disk, information is recorded by arranging a mark area (pit) and a space area (land) to have predetermined lengths and to be in a predetermined combination. The mark area and the space area have differing reflection rates as is explained in detail below. In recording information on an optical disk, the light emission power of the light source is controlled so that a mark area and a space area are formed each with a predetermined length and at a predetermined position.

For example, in a recordable optical disk that includes organic dye in its recording layer (conveniently referred to as 'dye disk' hereinafter) such as a CD-R (CD-recordable), a DVD-R (DVD-recordable), or a DVD+R (DVD+recordable), the dye is heated and melted by increasing the light emission power so that a substrate portion that is in contact with the melted dye changes in quality and shape when forming the mark region. On the other hand, when forming the space area, the light emission power is controlled to be lower at about the same level as that used in a playback operation so that the substrate does not change in quality nor shape. Thus, the reflection rate is lower in the mark area compared to the space area.

Generally, in a dye disk, recording sensitivity is considerably susceptible to change in response to a change in the wavelength of the laser beam. Thus, when the wavelength of the laser beam changes, the optimum light emission power (also referred to as 'recording power' hereinafter) for forming the mark area changes as well. Also, in the optical pick-up device, when the temperature of the light source changes, the wavelength of the laser beam emitted from the light source changes as well. This in turn means that when the temperature of the light source changes, the optimum recording power changes as well.

Accordingly, in Japanese Patent Laid-Open Publication No. 2001-297437 (referred to as 'publicly known art' hereinafter), for example, an optical recording apparatus implementing a temperature sensor close to the optical pick-up device is disclosed. In this optical recording apparatus, the temperature around the optical pick-up device is detected with the temperature sensor upon recording, and if a change in temperature is detected to be above a predetermined value, the pulse form (also referred to as 'recording strategy' hereinafter) of the laser beam emitted from the light source may be changed, or a test writing for determining the optimum recording power (OPC: optimum power control) may be conducted.

Also, in a recordable optical disk, a test writing area for determining the optimum recording power for the optical disk is provided. This area is called a power calibration area (PCA). For example, a PCA in the CD-R has a test area that is divided into 100 partitions. Further, each partition of the test area is made up of 15 frames. Normally, in OPC (optimum power control), one partition is used to conduct a test writing of a predetermined set of data. Specifically, the test writing is performed by recording the predetermined data at a fixed linear speed while gradually changing the recording power in each frame. Then, the recording power with which the best recording quality is achieved is selected as the optimum recording power.

The relation between the temperature around the optical pick-up device and the optimum recording strategy cannot be determined unambiguously since this condition is greatly influenced by various factors such as the characteristics of the light source, the recording sensitivity of the information recording medium, and the recording speed. However, in the optical recording apparatus disclosed in the above-mentioned publicly known art, when a temperature change is determined to be above a predetermined value, only the temperature around the optical pick-up device is taken into account in changing the recording strategy. Thus, the selected recording strategy may not necessarily be the optimum recording strategy, and this may cause a degradation in the recording quality.

Also, in the optical recording apparatus disclosed in the above-mentioned publicly known art, OPC is performed each time the temperature change exceeds a predetermined value and thus, there may be a shortage of partitions in the test writing area.

SUMMARY OF THE INVENTION

The present invention has been conceived in response to the above-described problems of the related art, and its first object is to provide a recording condition compensation method in which a degradation of recording quality can be prevented and an optimum recording quality can be stably achieved.

Also, a second object of the present invention is to provide a program that is capable of preventing a degradation of recording quality and stably achieving an optimum recording quality, the program being executed in a computer controlling an information recording apparatus. The second object of the present invention further includes providing a recording medium on which the program is recorded.

Also, a third object of the present invention is to provide an information recording apparatus that is capable of stably recording information with excellent recording quality.

More specifically, the present invention provides a recording condition compensation method that is adapted to compensate a recording condition for recording information on an information recording medium using an optical beam emitted from a light source, the method including:

a first step of detecting temperature information in the vicinity of the light source at a predetermined timing;

a second step of acquiring wavelength information of an optical beam emitted from the light source based on the detected temperature information and pre-acquired wavelength temperature characteristic information of the optical beam emitted from the light source;

a third step of acquiring wavelength dependency information of the recording condition for recording information on the information recording medium; and a fourth step of compensating the recording condition for recording information on the information recording medium based on the wavelength information acquired in the second step and the wavelength dependency information of the recording condition acquired in the third step.

Here, it is noted that the term 'temperature information' used in the present application refers to the temperature itself as well as an amount of change in the temperature, information changing due to the change in the temperature, and any other form of information that may be converted into the temperature. Also, the term 'wavelength information' refers to the wavelength itself as well as the amount of change in the wavelength, information changing due to the change in the wavelength, and any other form of information that may be converted into the wavelength.

According to the above invention, even when the light source temperature at a time of recording information on an information recording medium is different from the light source temperature at an earlier time in which the recording condition has been set, the recording condition can still be accurately compensated without expending a test-writing area. Also, since there is no need to perform test-writing each time information is to be recorded, the required time for the recording process can be shortened. Further, since the temperature information of the light source is detected right before the recording of information on the information recording medium, the change in the optimum recording condition due to the change in the light source temperature can be accurately obtained, and an accurate compensation of the recording condition can be realized. As a result, the degradation of recording quality can be prevented and excellent recording quality can be stably achieved.

Also, in the above invention, the recording condition may include recording power of the light source.

Further, the above recording condition compensation method may include:

a fifth step of conducting test-writing on a predetermined location of the information recording medium and obtaining optimum recording power; and in the fourth step, the recording condition may be compensated based on the optimum recording power obtained in the fifth step.

Further, the above recording condition compensation method may include:

a sixth step of acquiring information on a relation between the wavelength of a recording beam and recording power, the information being pre-recorded on the information recording medium; and in the third step, the wavelength dependency information of the recording condition may be acquired based on the information acquired in the sixth step.

Accordingly, the wavelength dependency information of the recording condition can be directly obtained for each information recording medium, and compensation can be performed according to the characteristics of each information recording medium.

In another aspect, the present invention provides a program used in an information recording apparatus that is adapted to record information on an information recording medium using an optical beam emitted from a light source, the program containing instructions for a computer controlling the information recording apparatus to perform:

a first procedure of detecting temperature information in the vicinity of the light source at a predetermined timing;

a second procedure of acquiring wavelength information of the optical beam emitted from the light source based on the detected temperature information and pre-acquired wavelength temperature characteristic information of the optical beam emitted from the light source;

a third procedure of acquiring wavelength dependency information of the recording condition for recording information on the information recording medium; and a fourth procedure of compensating the recording condition for recording information on the information recording medium based on the wavelength information acquired in the second procedure and the wavelength dependency information of the recording condition acquired in the third procedure.

In another aspect, the present invention provides a computer readable recording medium on which the above-described program is recorded.

In a further aspect, the present invention provides an information recording apparatus that is adapted to record information on an information recording medium using an optical beam emitted from a light source, the apparatus including:

temperature detection means for detecting temperature information in the vicinity of the light source at a predetermined timing;

first storage means for storing wavelength temperature characteristic information of the optical beam emitted from the light source;

wavelength information acquisition means for acquiring wavelength dependency information of the recording condition for recording information on the information recording medium;

wavelength acquisition means for acquiring wavelength information of the optical beam emitted from the light source based on the temperature information detected by the temperature detection means and the wavelength temperature characteristic information stored by the first storage means;

compensation means for compensating the recording condition for recording information on the information recording medium based on the wavelength information acquired by the wavelength acquisition means and the wavelength dependency information of the recording condition acquired by the wavelength information acquisition means; and recording means for recording information on the information recording medium based on the compensated recording condition.

DESCRIPTION OF THE PREFERRED EMBODIMENTS

In the following, preferred embodiments of the present invention are described with reference to the accompanying drawings.

Figure 1:
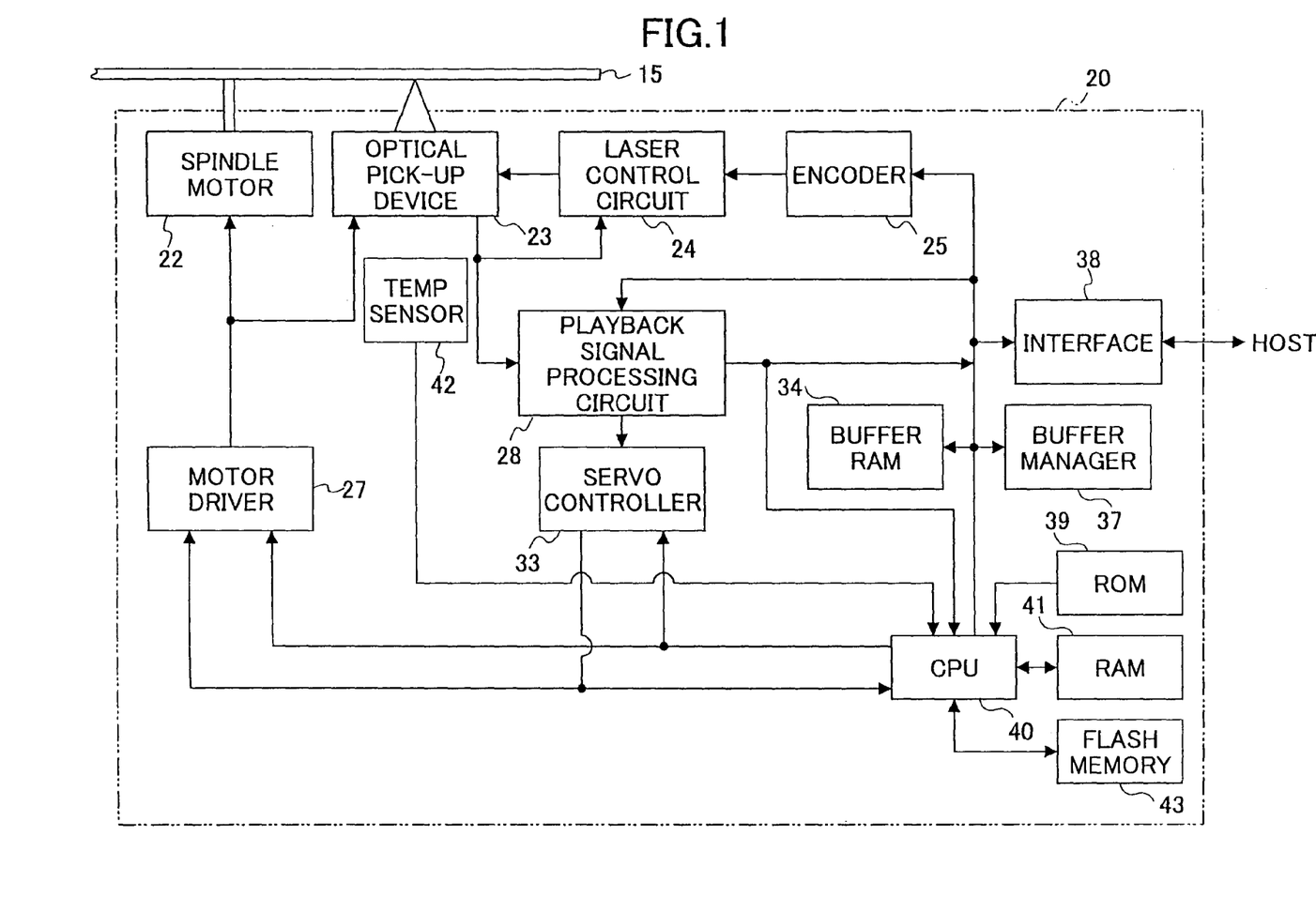
FIG. 1 is a block diagram showing a configuration of an optical disk apparatus according to an embodiment of the present invention.

FIG. 1 shows a schematic view of an optical disk apparatus as an information recording apparatus according to a first embodiment of the present invention.

The optical disk apparatus 20 shown in FIG. 1 includes a spindle motor 22 that drives the optical disk 15 to rotate, an optical pick-up device 23, a laser control circuit 24, an encoder 25, a motor driver 27, a playback signal processing circuit 28, a servo controller 33, a buffer RAM 34, a buffer manager 37, an interface 38, a ROM 39, a CPU 40, a RAM 41, a flash memory 43 (first recording unit and second recording unit), and a temperature sensor 42 as a temperature detection unit. Here, it is noted that the arrows shown in FIG. 1 indicate the flow of the major signals and information; that is, they are not a representation of all the connections established between the blocks shown in the drawing.

The optical pick-up device 23 is an apparatus for irradiating a laser beam onto a recording side of the optical disk 15 on which side a spiral track or concentric tracks are formed. The optical pick-up device 23 is also adapted to receive reflected light from the recording side.

Figure 2:
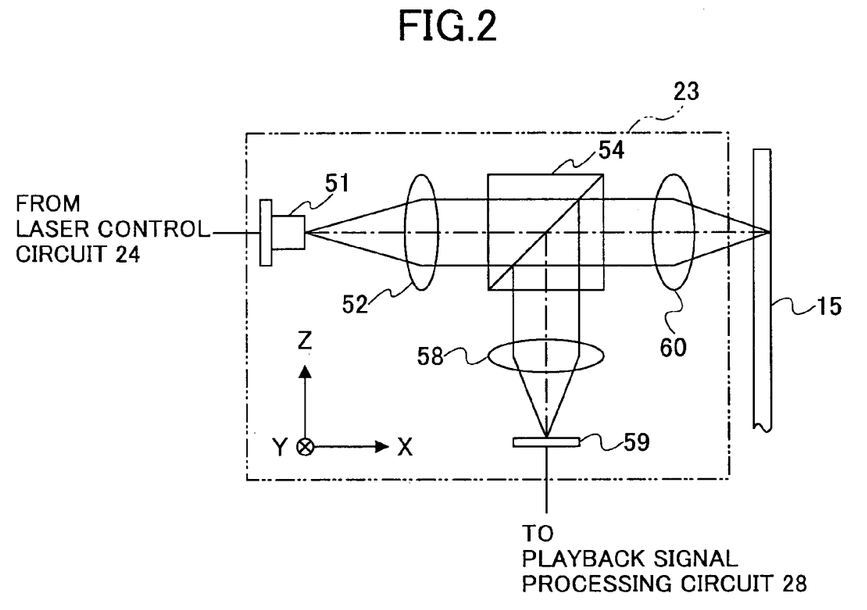
FIG. 2 is a block diagram illustrating a detailed configuration of an optical pick-up device shown in FIG. 1.

FIG. 2 shows an exemplary configuration of this optical pick-up device 23. In this drawing, the optical pick-up device 23 includes a light source unit 51, a collimator lens 52, a beam splitter 54, an objective lens 60, a detection lens 58, a light receiver 59, and a drive system (focusing actuator, tracking actuator, and seek motor, none of which are shown in the drawing).

The light source unit 51 includes a semiconductor laser (not shown) as the light source that emits a laser beam with a predetermined wavelength. The amount of light in the laser beam emitted from the light source unit 51 is detected by a monitor (not shown), and the detection result is supplied to the laser control circuit 24 as a light emission level signal. It is noted that in the present embodiment, the emitting direction of the laser beam at which the maximum light intensity can be obtained in the laser beam emitted from the light source unit 51 is assumed to be the direction +X in FIG. 2. In the +X direction side of the light source unit 51, the collimator lens 52 is implemented, and the collimator lens 52 arranges the laser beam (the rays of the laser beam) emitted from the light source unit 51 to be approximately parallel.

In the +X direction side of the collimator lens 52, the beam splitter 54 is implemented, and this beam splitter 54 diverts the returning light from the optical disk 15 in the −Z direction. In the +X direction side of the beam splitter 54, the objective lens 60 is implemented and this objective lens 60 condenses the laser beam penetrating through the beam splitter 54 and forms an optical spot on the recording side of the optical disk 15.

Also, on the −Z direction side of the beam splitter 54, the detection lens 58 is implemented, and this detection lens 58 condenses the returning (reflected) light diverted by the beam splitter 54. In the −Z direction side of the detection lens 58, the light receiver 59 is implemented, and this light receiver 59 receives the reflected light from the recording side of the optical disk 15 and outputs a signal including, for example, wobble signal information, playback information, focus error information, and track error information like any regular optical pick-up device.

In the following, the operation of the optical pick-up device 23 having the above-described configuration will be briefly explained. First, the optical beam emitted from the light source unit 51 is arranged to be approximately parallel by the collimator lens 52, and the optical beam is then incident on the beam splitter 54. The optical beam penetrates through the beam splitter 54 and is condensed through the objective lens 60 onto the recording side of the optical disk 15 into a microscopic beam spot. Then, the reflected light as the returning light reflected from the recording side of the optical disk 15 is arranged to be approximately parallel by the objective lens 60, and this returning light is incident on the beam splitter 54. The returning light is diverted in the −Z direction by the beam splitter 54 and is received at the light receiver 59 via the detection lens 58. From the light receiver 59, a signal corresponding to the received amount of light is output to the playback signal processing circuit 28.

Referring back to FIG. 1, the playback signal processing circuit 28 detects signals such as a wobble signal, RF signals, and servo signals (focus error signal and track error signal), based on the output signal from the light receiver 59 in the optical pick-up device 23. Subsequently, the playback signal processing circuit 28 extracts address information and synchronization information, for example, from the wobble signal. The address information extracted herein is output to the CPU 40, and the synchronization information is output to the encoder 25. Further, the playback signal processing circuit 28 performs error compensation processing, for example, on the RF signal, and then stores the resulting processed signal in the buffer RAM 34 via the buffer manager 37. Also, the servo signal is output to the servo controller 33 from the playback signal processing circuit 28.

The servo controller 33 generates a control signal for controlling the tracking actuator of the optical pick-up device 23 based on the track error signal, and outputs the generated control signal to the motor driver 27. Also the servo controller 33 generates a control signal for controlling the focusing actuator of the optical pick-up device 23 based on the focus error signal, and outputs the generated control signal to the motor driver 27.

The motor driver 27 controls the tracking actuator and the focusing actuator of the optical pick-up device 23 based on the control signals from the servo controller 33. In this way, tracking control and the focusing control are realized. It is noted that tracking control and focusing control are performed whenever the optical disk 15 is accessed for a recording process or the playback process, for example. Also, the motor driver 27 controls the spindle motor 22 and the optical pick-up device 23 (including the seek motor) based on instructions from the CPU 40.

The buffer manager 37 manages the input/output of the data for the buffer RAM 34, and notifies the CPU 40 when the amount of accumulated data reaches a predetermined value.

The encoder 25 takes out the data accumulated in the buffer RAM 34 via the buffer manager 37 based on instructions from the CPU 40, and conducts various processes such as attaching an error correction code. The encoder 25 also generates a write signal for the optical disk 15. Then, the encoder 25 outputs the write signal to the laser control circuit 24 in synch with a synchronization signal from the playback signal processing circuit 28.

Figure 3:
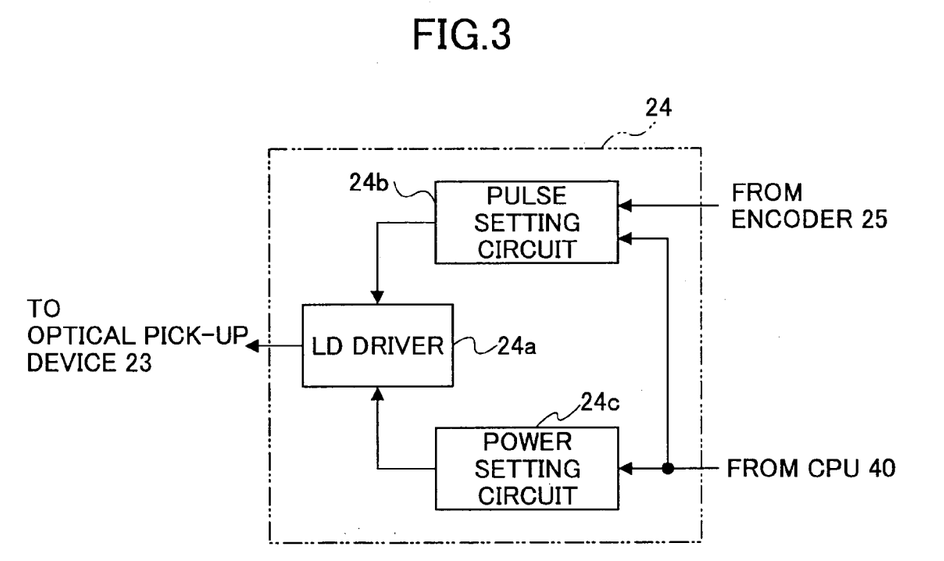
FIG. 3 is a block diagram illustrating a detailed configuration of a laser control circuit shown in FIG. 1.

Referring to FIG. 3, the laser control circuit 24 includes a LD driver 24a, a pulse setting circuit 24b, and a power setting circuit 24c, for example. The pulse setting circuit 24b, following instructions from the CPU 40, changes the pulse width of the write signal from the encoder 25 by adjusting the rising edge of the write signal. The power setting circuit 24c sets the recording power based on instructions from the CPU 40. The LD driver 24a controls the output of the semiconductor laser from the optical pick-up device 23 based on the pulse-adjusted write signal obtained at the pulse setting circuit 24b and the recording power set at the power setting circuit 24c. The LD driver 24a performs feedback control of the output of the semiconductor laser based on the light emission level signal from the monitor (not shown) of the optical pick-up device 23 while the semiconductor laser is being emitted.

Referring back to FIG. 1, the interface 38 is a communication interface for communicating with a host in both directions, and this interface 38 may be in conformity with the ATAPI (AT Attachment Packet Interface) or the SCSI (Small Computer System Interface) standard, for example.

The temperature sensor 42 is implemented close to the light source unit 51, and is adapted to detect the temperature in the area around (in the vicinity of) the light source unit 51. The temperature information is then output to the CPU 40.

The ROM 39 stores programs including a program for compensating the recording condition that is described with codes readable by the CPU 40 (referred to as 'recording condition compensation program' hereinafter). When the power of the optical disk apparatus is turned on, the programs stored in the ROM 39 are loaded in the main memory (not shown) of CPU 40.

Figure 4:
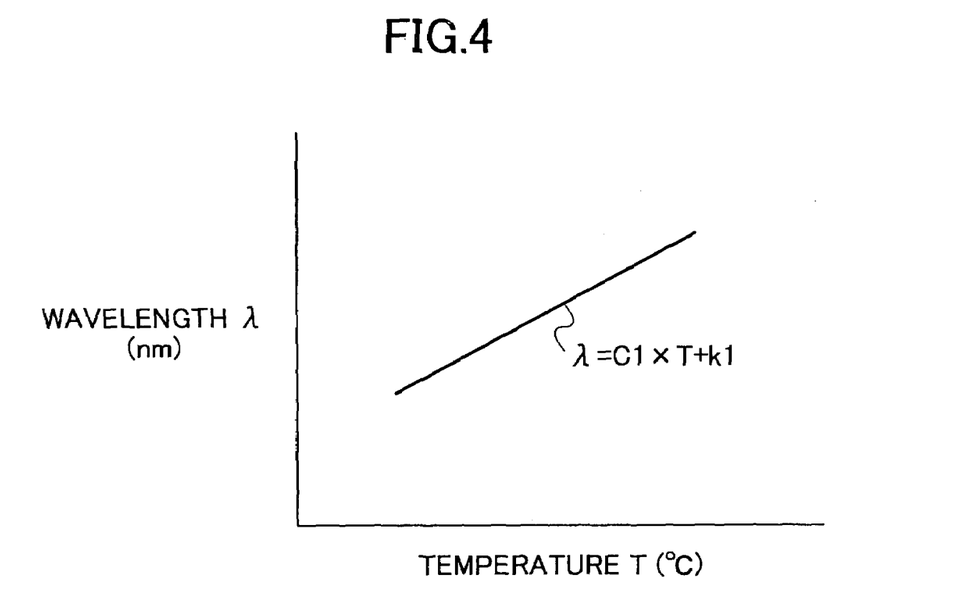
FIG. 4 is a graph illustrating a relation between the wavelength of an optical beam emitted from a light source unit and the light source temperature.

The flash memory 43 stores information on a relation between the temperature obtained from the detection result in the temperature sensor 42 (conveniently referred to as 'light source temperature' hereinafter) and the wavelength of the optical beam emitted from the light source unit 51 (this relation being referred to as 'temperature-wavelength relation' hereinafter). This temperature-wavelength relation is determined at least in one of the manufacturing process of the optical disk apparatus 20, the manufacturing process of the optical pick-up device 23, the manufacturing process of the light source unit 51, and the manufacturing process of the semiconductor laser. In the present embodiment, the relation between the wavelength $\lambda$ and the light source temperature T is represented by the following equation (1) as shown in FIG. 4.

$$\lambda = C1 \times T + k1 \tag{1}$$

Herein, C1 is a coefficient and k1 is a constant. Also, in the flash memory 43, the temperature-wavelength relation may be stored in the form of a table, or alternatively, the coefficient C1 and the constant k1 may be stored.

Figure 5:
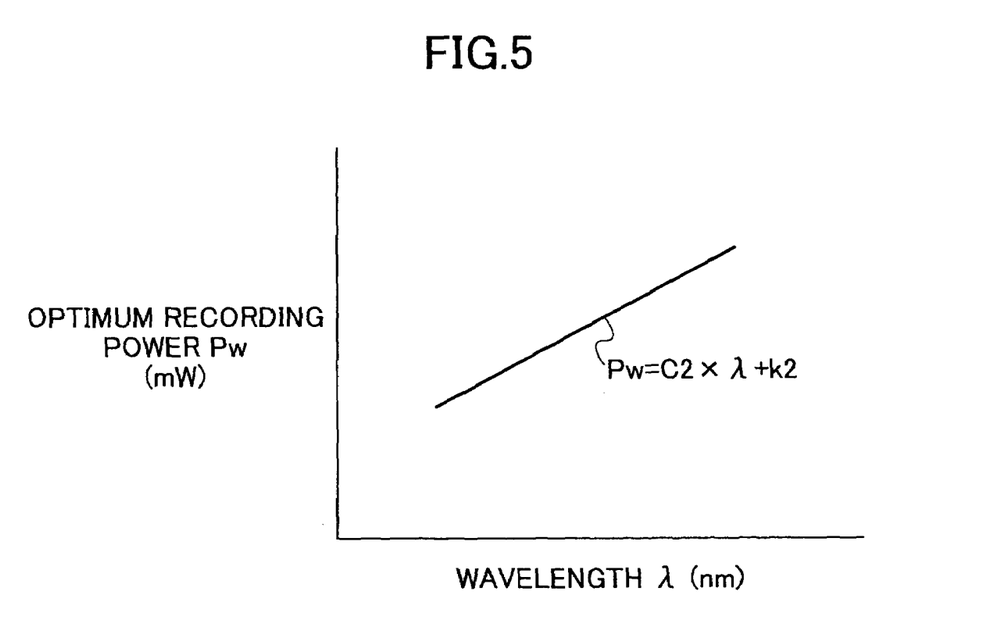
FIG. 5 is a graph illustrating a relation between the wavelength of an optical beam irradiated for recording information on an optical disk and the optimum recording power.

Also, the flash memory 43 stores information on a relation between the wavelength of the recording beam and the optimum recording power for each type of optical disk (e.g., depending on each vendor), this relation being referred to as 'wavelength-recording power relation' hereinafter. This wavelength-recording power relation is determined for each type of optical disk. In the present embodiment, the relation between the optimum recording power Pw and the wavelength $\lambda$ for the optical disk 15 is represented by the following equation (2), as shown in FIG. 5, wherein C2 is a coefficient and k2 is a constant.

$$Pw = C2 \times \lambda + k2 \tag{2}$$

Further, the flash memory 43 stores a conversion table for the detection result of the temperature sensor and the light source temperature. The CPU 40 refers to this conversion table to obtain the light source temperature based on the detection result of the temperature sensor 42. It is noted that the contents stored in the flash memory 43 will not be erased even when the power supply is stopped.

Figure 6:
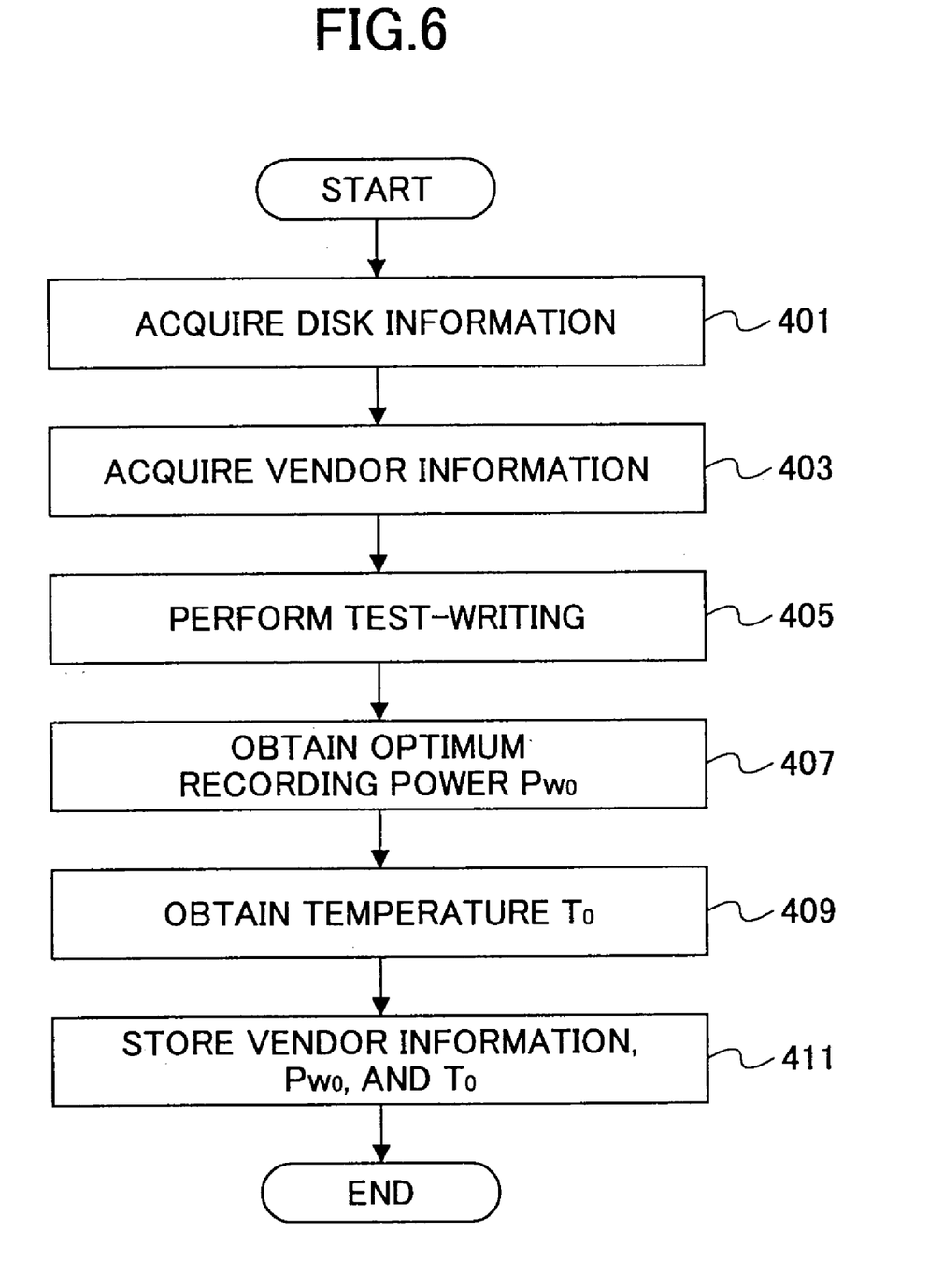
FIG. 6 is a flowchart illustrating a process of obtaining vendor information and the optimum recording power for a recording medium.

Next, referring to FIG. 6, the process of obtaining the optimum recording power through test writing when the optical disk 15 is set at the predetermined position in the optical disk apparatus (referred to as 'recording power acquisition process' hereinafter) is explained. The flowchart of FIG. 6 corresponds to a sequence of processing algorithms that are executed by the CPU 40. When the optical disk 15 is set, a top (start of file) address of the program corresponding to the flowchart of FIG. 6 is set to a program counter of the CPU 40, and the optimum recording power acquisition process is initiated.

First, in step 401, disk information recorded at a predetermined location of the optical disk 15 is obtained.

Next, in step 403, information relating to the vendor (vendor information) is obtained from the disk information.

Then, in step 405, test writing is performed on the power calibration area (PCA) of the optical disk 15, that is, predetermined data are test-written at a predetermined linear speed onto the PCA while the recording power is gradually changed.

Then, in step 407, the optimum recording power is obtained based on the test writing results (the optimum recording power being denoted as $Pw_0$ in this example). In this step, for example, each set (frame) of test-written data is replayed, and the respective recording quality is determined based on the upper and lower symmetry and the amplitude of the corresponding playback signal. Thus, the recording power with which the best recording quality is achieved is determined to be the optimum recording power $Pw_0$.

Then, in step 409, the light source temperature (herein denoted as $T_0$) is obtained from the detection result of the temperature sensor 42.

Then, in step 411, the vendor information, the optimum recording power Pw0, and the light source temperature T0 are stored in the RAM 41 after which the recording power acquisition process ends.

Figure 7:
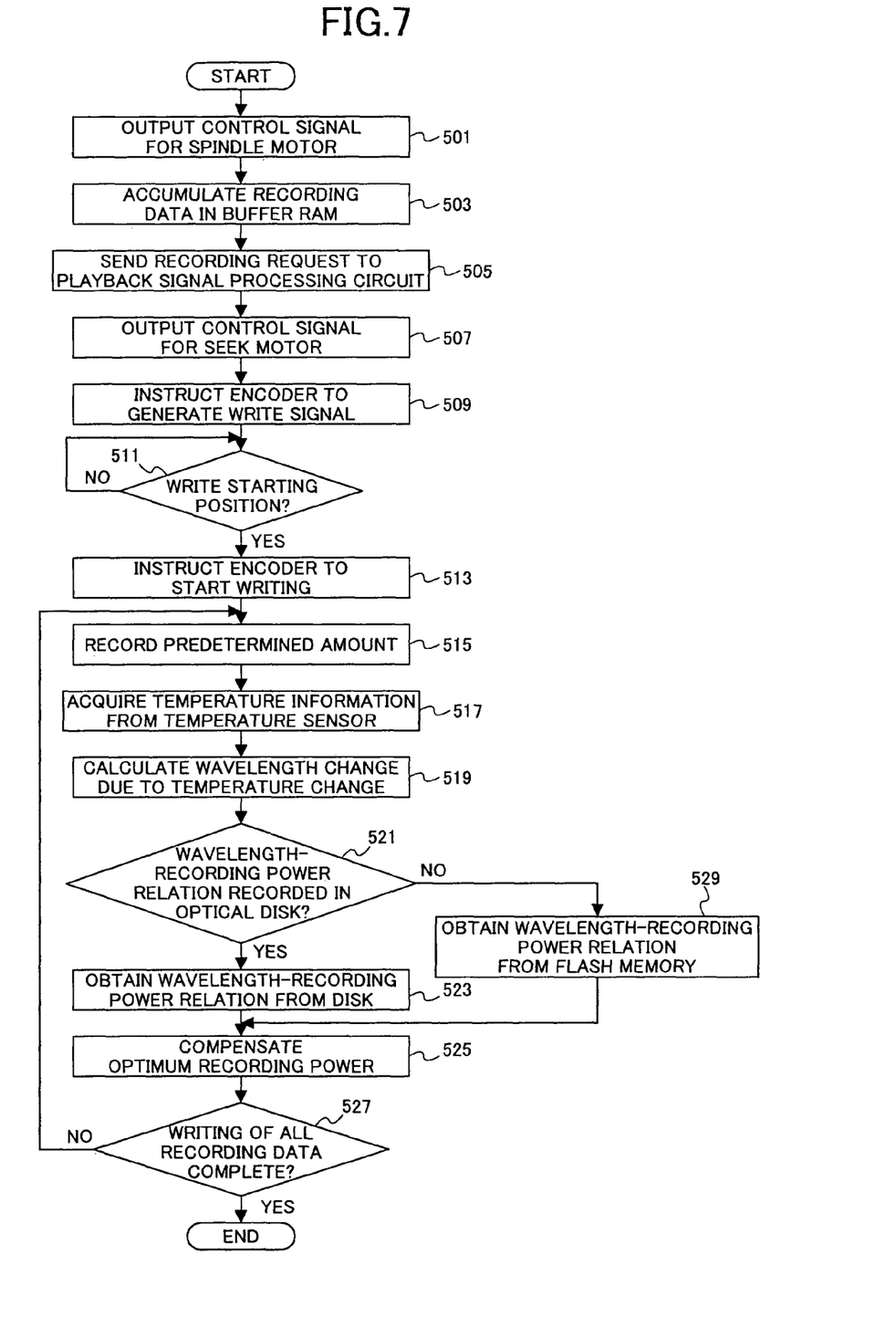
FIG. 7 is a flowchart illustrating a recording condition compensation program according to the present invention.

Next, referring to FIG. 7, a process performed upon receiving a recording command from the host (the process being referred to as 'recording control process' hereinafter) is explained. The flowchart of FIG. 7 corresponds to a sequence of processing algorithms executed by the CPU 40. When the recording command is received from the host, the top address of the program corresponding to the flowchart of FIG. 7 is set to the program counter of the CPU 40, and the recording control process is initiated.

First, in step 501, a control signal for controlling the rotation of the spindle motor 22 according to a designated recording speed is output to the motor driver 27.

Next, in step 503, the recording data received from the host is accumulated in the buffer RAM 34 via the buffer manager 37.

Then, in step 505, the playback signal processing circuit 28 is notified of the reception of the recording command from the host. In this way, tracking control and focusing control are performed by the playback signal processing circuit 28, the servo controller 33, and the motor driver 27. Also, the address information is sent to the CPU 40 from the playback signal processing circuit 28.

Then, in step 507, a signal for controlling a seek motor of the optical pick-up device 23 so that the optical pick-up device 23 is positioned at a designated write starting point according to the address information is output to the motor driver 27.

Then, in step 509, the encoder 25 is instructed to generate a write signal.

Then, in step 511, it is determined whether the optical pick-up device 23 is positioned at the write starting point based on the address information. Herein, if the optical pick-up device 23 is positioned at the write starting point, an affirmative determination is made in step 511, and the process moves on to step 513.

In step 513, the encoder 25 is instructed to start writing. In this way, the write signal is output to the laser control circuit 24, where it is adjusted based on the recording condition. Then, the write signal is input to the light source unit 51 of the optical pick-up device 23.

Next, in step 515, recording of a predetermined amount of data is performed.

Then, in step 517, the light source temperature (herein denoted as $T_1$) is obtained based on the detection result from the temperature sensor 42.

Then, in step 519, referring to the temperature-wavelength relation stored in the flash memory 43, a wavelength change $\Delta\lambda$ in the optical beam emitted from the light source unit 51 is calculated based on the following equation (3).

$$\Delta\lambda = C1 \times (T_1 - T_0) \tag{3}$$

Then, in step 521, it is determined whether information concerning the relation between the wavelength of the recording beam and the recording power is recorded at the predetermined location of the optical disk 15. Herein, if the information concerning the relation between the wavelength of the recording beam and the recording power is recorded at the predetermined location of the optical disk 15, an affirmative determination is made in step 521 and the process moves on to step 523.

In step 523, information on the relation between the wavelength of the recording beam and the recording power is obtained from the predetermined location of the optical disk 15.

Then, in step 525, the optimum recording power (herein denoted as $Pw_1$) is calculated based on the wavelength change $\Delta\lambda$ and the wavelength-recording power relation. Specifically, the optimum recording power $Pw_1$ is calculated based on the following equation (4).

$$Pw_1 = C2 \times \Delta\lambda + Pw_0 \tag{4}$$

The calculation result is then output to the power setting circuit 24c. In this way the compensation of the recording power is performed.

Then, in step 527, it is determined whether all the recording data have been written. Herein, if the recording is not yet completed, a negative determination is made in step 527 and the process is returned back to step 521, and the recording control process is continued.

Also, in step 521, if it is determined that information on the relation between the wavelength of the recording beam and the recording power is not recorded at the predetermined location in the optical disk 15, a negative determination is made in step 521 and the process moves on to step 529.

In step 529, the wavelength-recording power relation stored in the flash memory 43 is searched using the vendor information of the optical disk 15 as a key, and thus, the wavelength-recording power relation corresponding to the optical disk 15 is obtained. Then, the process moves on to step 525.

Also, in step 527, if it is determined that all the recording data have been written, an affirmative determination is made in step 527 and the recording control process is completed.

In the following, the processing operation of the optical disk apparatus 20 upon receiving a playback command from the host is briefly explained.

Upon receiving the playback command from the host, the CPU 40 outputs a control signal to the motor driver 27, the control signal controlling the rotation of the spindle motor 22 according to the designated playback speed. The CPU 40 also notifies the playback signal processing circuit 28 of the reception of the playback command from the host. Then, when the rotation of the optical disk 15 reaches a predetermined linear speed, tracking control and focusing control are performed. Also, the playback signal processing circuit 28 detects the address information and sends this information to the CPU 40.

Based on the address information, the CPU 40 outputs a signal for controlling the seek motor to the motor driver 27 so that the optical pick-up device 23 is positioned at the designated read starting point. After the CPU 40 determines that the optical pick-up device 23 is positioned at the designated read starting position, it notifies the playback signal processing circuit 28.

Then the playback signal processing circuit 28 searches for a RF signal based on the output signal from the light receiver 59, and performs an error correction process, for example, after which the RF signal is accumulated in the buffer RAM 34. When the playback data accumulated in the buffer RAM 34 form a complete sector of data, the buffer manager 37 sends the sector of data to the host via the interface 38.

It is noted that the optical disk apparatus of the present embodiment corresponds to an information recording apparatus of the present invention. Further, in the present embodiment, wavelength information acquisition means is realized by the flash memory 43, the CPU 40, and the programs executed by the CPU 40. Also, wavelength acquisition means, compensation means, recording means, test-writing means, and type acquisition means are realized by the CPU 40 and the programs executed by the CPU 40. Specifically, the wavelength acquisition means is realized by the process of step 519 in FIG. 7, the compensation means is realized by the process of step 525 in FIG. 7, the recording means is realized by the process of step 515 in FIG. 7, the test-writing means is realized by the processes of steps 405 and 407 in FIG. 6, and the type acquisition means is realized by the processes of steps 401 and 403 in FIG. 6. However, the above described embodiment is merely one example, and the present invention is not limited to this particular arrangement. For example, at least one of the means realized by the processes included in a program of the CPU 40 may be realized by a hardware unit, or alternatively, all the means may be realized by hardware units.

Also, in the above-described embodiment, the recording condition compensation program contains instructions for executing the processes shown in the flowcharts of FIGS. 6 and 7. Namely, a first procedure according to the present invention is realized by an instruction for executing the process of step 517 in FIG. 7, a second procedure is realized by an instruction for executing the process of step 519, a third procedure is realized by instructions for executing the processes of steps 523 and 529, a fourth procedure is realized by an instruction for executing the process of step 525, a fifth procedure is realized by an instruction for executing the process of step S515, a sixth procedure is realized by instructions for executing the processes of steps 405 and 407 in FIG. 6, and a seventh procedure is realized by an instruction for executing the process of step 523 in FIG. 7.

Also, a first step in a recording condition compensation method according to the present invention is realized by the process of step 517 in FIG. 7, a second step is realized by the process of step 519, a third step is realized by the processes of steps 523 and 529, and a fourth step is realized by the process of step 525. Also, a fifth step is realized by the processes of steps 405 and 407 in FIG. 6, and a sixth step is realized by the process of step 523 in FIG. 7.

As explained above, according to the optical disk apparatus and the recording condition compensation method of the present embodiment, the light source temperature is detected at the time of recording, and the wavelength change of the optical beam emitted from the light source unit 51 is calculated based on the wavelength temperature characteristic information of the optical beam emitted from the light source unit 51 stored in the flash memory 43. Then, the recording power is compensated based on the calculated wavelength change and the wavelength dependency information of the recording power of the optical disk stored in the flash memory 43. Thus, even when the light source temperature at a time of recording information on the optical disk is different from the light source temperature at a previous time in which the recording power has been set, the recording power can still be accurately compensated without expending a partition in the test-writing area. Also, since there is no need to perform test-writing at the time of recording, the required time for the recording process can be shortened. Further, since the light source temperature is detected right before recording on the optical disk, the change in the optimum recording power due to the change in light source temperature can be accurately calculated, and in turn, the recording power can be accurately compensated. As a result, the degradation of the recording quality can be prevented and an excellent recording quality can be stably achieved.

Also, according to the present embodiment, the optical disk type is detected when the optical disk is set to the optical disk apparatus and a corresponding wavelength-recording power relation is acquired therefrom. Thus, for example, even when the thickness of the recording layer or the width of the track pitch differs depending on the optical disk type, the recording power can be accurately compensated according to the characteristics of each optical disk type. The detection timing of the optical disk type is not limited to the time the optical disk is set to the optical disk apparatus. The detection timing is not a matter of great concern so long as the optical disk type is detected before the acquisition of the wavelength-recording power relation for the optical disk.

Also, according to the present embodiment, if information on the relation between the wavelength of the recording beam and the recording power is recorded at a predetermined location on the optical disk 15, the optimum recording power is compensated based on this information. In this case, the wavelength dependency information of the recording condition for each optical disk can be directly obtained, and a suitable compensation can be performed according to the characteristics of each optical disk.

Also, according to the present embodiment, if information on the relation between the wavelength of the recording beam and the recording power is not recorded at the predetermined location on the optical disk 15, the wavelength-recording power relation information stored in the flash memory is searched using the vendor information of the optical disk 15 as a key to obtain the wavelength-recording power relation corresponding to the optical disk 15, and the optimum recording power is compensated based on this wavelength-recording power relation. Therefore, even when the thickness of the recording layer or the width of the track groove of the optical disk is different depending on the optical disk type, the recording condition can be accurately compensated according to the characteristics of each optical disk type.

Further, according to the present embodiment, the temperature-wavelength relation information stored in the flash memory 43 corresponds to the detection results from detecting a temperature characteristic of the wavelength of the optical beam during at least one of the manufacturing process of the optical disk apparatus 20, the manufacturing process of the optical pick-up device 23, the manufacturing process of the light source unit 51, and the manufacturing process of the semiconductor laser. Thus, for example, variations in the temperature characteristics due to errors generated in the manufacturing process of the semiconductor laser may be adjusted. Thereby, the calculation accuracy of the wavelength can be improved, and the recording condition can be accurately compensated. As a result, recording with excellent recording quality can be stably achieved.

Also, in the optical disk apparatus according to the present embodiment, the temperature compensation of the optimum recording power is accurately performed upon recording so that recording with excellent recording quality can stably be obtained.

Further, in the present embodiment, a case in which the temperature-wavelength relation is approximated using a linear equation has been described; however, this relation may also be approximated using a polynomial equation. In this case, the change in the wavelength of the optical beam emitted from the light source unit 51 is obtained using an equation different from the equation (3).

Also, in the present embodiment, a case in which the wavelength-recording power relation is approximated using a linear equation has been described; however, this relation may also be approximated using a polynomial equation. In this case, the optimal recording power is obtained using an equation different from the equation (4).

Also, in the present embodiment, the flash memory 43 may store the temperature characteristics information in the form of a table indicating the relation between the light source temperature and the wavelength, or it may store the coefficient C1 and the constant k1 of the approximation equation. Similarly, the flash memory 43 may store the wavelength dependency information of the recording power in the form of a table indicating the relation between the optimum recording power and the wavelength, or it may store the coefficient C2 and the constant k2 of the approximation equation.

Also, in the present embodiment, the recording condition corresponds to the recording power; however, the present invention is not limited to this particular embodiment and the recording condition may also be the pulse width, for example.

Also, in the present embodiment, the recording power is compensated each time a predetermined amount of information is recorded; however, the present invention is not limited to this particular embodiment, and for example, the recording power may be compensated when the change in the light source temperature reaches or exceeds a predetermined value. Alternatively, the compensation timing may be changed depending on the amount of data that is to be recorded. For example, when the amount of data to be recorded is small, the recording power may be compensated just once right before the recording of this data.

Also, in the present embodiment, the optical disk apparatus is capable of recording and replaying information; however, the present invention is not limited to this particular embodiment. Namely, the optical disk apparatus of the present invention may be any optical disk apparatus that is at least capable of recording information out of the operations of recording, replaying, and erasing information.

Also, in the present embodiment, one light source is implemented; however, the present invention is not limited to this particular embodiment. For example, two light sources may be used from among a light source that emits an optical beam with a wavelength of 405 nm, a light source that emits an optical beam with a wavelength of 650 nm, and a light source that emits an optical beam with a wavelength of 780 nm. In this case, the temperature compensation may only be performed for a light source that is significantly influenced by the temperature, or preferably, the temperature compensation may be performed for each and all of the light sources.

Also, in the present embodiment, the recording condition compensation program is recorded in the ROM 39; however, this program may be recorded in other recording media such as a CD-ROM, a magneto-optical disk, a flash memory, and a flexible disk. In this case, a drive apparatus corresponding to each recording medium is implemented, and the recording condition compensation program is installed from the respective drive apparatus. In other words, the recording condition compensation program can be stored anywhere as long as it can be loaded into the main memory of the CPU 40.

As described above, the recording condition compensation method according to the present invention has an advantage of preventing the degradation of the recording quality and stably achieving excellent recording quality.

Also, the program and recording medium according to the present invention have advantages of being executed by a computer that controls the information recording apparatus, preventing the degradation of the recording quality, and stably achieving excellent recording quality.

Also, the information recording apparatus according to the present invention has an advantage of stably recording information with excellent recording quality.

The present application is based on and claims the benefit of the earlier filing date of Japanese priority application No. 2002-243222 filed on Aug. 23, 2002, the entire contents of which are hereby incorporated by reference.

What is claimed is:

1. A recording condition compensation method that is adapted to compensate a recording condition for recording information on an information recording medium using an optical beam emitted from a light source, the method comprising:
   a first step of detecting temperature information in the vicinity of the light source at a predetermined timing;
   a second step of acquiring wavelength information of the optical beam emitted from the light source based on the detected temperature information and pre-acquired wavelength temperature characteristic information of the optical beam emitted from the light source;
   a third step of acquiring information on a relationship between the wavelength of the optical beam and the recording condition for the type of information recording medium to be recorded on; and
   a fourth step of compensating the recording condition for recording information on the information recording medium based on the wavelength information acquired in the second step and the wavelength relationship information of the recording condition acquired in the third step.

2. The recording condition compensation method as claimed in claim 1 wherein the recording condition includes recording power of the light source.

3. The recording condition compensation method as claimed in claim 1, further comprising:
   a fifth step of conducting test-writing on a predetermined location of the information recording medium and obtaining optimum recording power; wherein
   in the fourth step, the recording condition is compensated based on the optimum recording power obtained in the fifth step.

4. The recording condition compensation method as claimed in claim 1, further comprising:
   a sixth step of acquiring information on a relation between the wavelength of a recording beam and recording power, said information being pre-recorded on the information recording medium; wherein
   in the third step, the wavelength relationship information of the recording condition is acquired based on the information acquired in the sixth step.

5. A computer readable medium encoded with a program used in an information recording apparatus that is adapted to record information on an information recording medium using an optical beam emitted from a light source, said program comprising instructions for a computer controlling the information recording apparatus to perform:
   a first procedure of detecting temperature information in the vicinity of the light source at a predetermined timing;
   a second procedure of acquiring wavelength information of the optical beam emitted from the light source based on the detected temperature information and pre-acquired wavelength temperature characteristic information of the optical beam emitted from the light source;
   a third procedure of acquiring information on a relationship between the wavelength of the optical beam and the recording condition for the type of information recording medium to be recorded on; and a fourth procedure of compensating the recording condition for recording information on the information recording medium based on the wavelength information acquired in the second procedure and the wavelength relationship information of the recording condition acquired in the third procedure.

6. The computer readable medium encoded with a program as claimed in claim 5 wherein the recording condition includes recording power of the light source.

7. The computer readable medium encoded with a program as claimed in claim 5, further comprising instructions for the computer controlling the information recording apparatus to perform a fifth procedure of recording information on the information recording medium based on the compensated recording condition.

8. The computer readable medium encoded with a program as claimed in claim 5, further comprising instructions for the computer controlling the information recording apparatus to perform:

a sixth procedure of conducting test-writing on a predetermined location of the information recording medium and obtaining optimum recording power; wherein in the fourth procedure, the recording condition is compensated based on the optimum recording power obtained through the test-writing.

9. The computer readable medium encoded with a program as claimed in claim 5, further comprising instructions for the computer controlling the information recording apparatus to perform:

a seventh procedure of acquiring information on a relation between the wavelength of a recording beam and recording power, said information being pre-recorded on the information recording medium; wherein in the third procedure, the wavelength dependency information of the recording condition is acquired based on the information acquired in the seventh procedure.

10. A computer readable recording medium comprising a recording part that is adapted to store a program used in an information recording apparatus that records information on an information recording medium using an optical beam emitted from a light source, the program containing instructions for a computer controlling the information recording apparatus to perform procedures of detecting temperature information in the vicinity of the light source at a predetermined timing, acquiring wavelength information of the optical beam emitted from the light source based on the detected temperature information and pre-acquired wavelength temperature characteristic information of the optical beam emitted from the light source, acquiring information on a relationship between the wavelength of the optical beam and the recording condition for the type of information recording medium to be recorded, on and compensating the recording condition based on the wavelength information and the wavelength relationship information.

11. An information recording apparatus that is adapted to record information on an information recording medium using an optical beam emitted from a light source, said apparatus comprising:

temperature detection means for detecting temperature information in the vicinity of the light source at a predetermined timing;

first storage means for storing wavelength temperature characteristic information of the optical beam emitted from the light source;

wavelength information acquisition means for acquiring information on a relationship between the wavelength of the optical beam and the recording condition for the type of information recording medium to be recorded on;

wavelength acquisition means for acquiring wavelength information of the optical beam emitted from the light source based on the temperature information detected by the temperature detection means and the wavelength temperature characteristic information stored by the first storage means;

compensation means for compensating the recording condition for recording information on the information recording medium based on the wavelength information acquired by the wavelength acquisition means and the wavelength relationship information of the recording condition acquired by the wavelength information acquisition means; and recording means for recording information on the information recording medium based on the compensated recording condition.

12. The information recording apparatus as claimed in claim 11, further comprising:

test-writing means for conducting test-writing on a predetermined location of the information recording medium and obtaining optimum recording power; wherein the compensation means is arranged for compensating the recording condition based on the optimum recording power obtained by the test-writing means.

13. The information recording apparatus as claimed in claim 11 wherein the first storage means is arranged for storing information corresponding to a detection result from detecting a wavelength temperature characteristic of the optical beam emitted from the light source during a manufacturing process of said information recording apparatus.

14. The information recording apparatus as claimed in claim 11, further comprising:

recording information acquisition means for acquiring information on a relation between the wavelength of a recording beam and recording power, said information being pre-recorded on the information recording medium; wherein the wavelength information acquisition means is arranged for acquiring the wavelength relationship information of the recording condition based on the information on the relation between the wavelength of the recording beam and the recording power acquired by the recording information acquisition means.

15. The information recording apparatus as claimed in claim 11, further comprising:

type acquisition means for acquiring a type of the information recording medium; and second storage means for storing the wavelength relationship information of the recording condition for each of the types of information recording medium; wherein the wavelength information acquisition means is arranged for acquiring the wavelength relationship information of the recording condition from the second storing means according to the type of information recording medium acquired by the type acquisition means.

* * * * *